US012220384B2

(12) United States Patent
Saito et al.

(10) Patent No.: US 12,220,384 B2
(45) Date of Patent: Feb. 11, 2025

(54) PACIFIER

(71) Applicant: PIGEON CORPORATION, Tokyo (JP)

(72) Inventors: Satoru Saito, Tokyo (JP); Satoshi Koyama, Tokyo (JP); Masatomo Ohara, Tokyo (JP); Chikako Mori, Tokyo (JP)

(73) Assignee: PIGEON CORPORATION, Tokyo (JP)

( * ) Notice: Subject to any disclaimer, the term of this patent is extended or adjusted under 35 U.S.C. 154(b) by 473 days.

(21) Appl. No.: 17/627,716

(22) PCT Filed: Jul. 13, 2020

(86) PCT No.: PCT/JP2020/027283
§ 371 (c)(1),
(2) Date: Jan. 17, 2022

(87) PCT Pub. No.: WO2021/010381
PCT Pub. Date: Jan. 21, 2021

(65) Prior Publication Data

US 2022/0257473 A1 Aug. 18, 2022

(30) Foreign Application Priority Data

Jul. 17, 2019 (JP) ................................ 2019-132296

(51) Int. Cl.
*A61J 17/00* (2006.01)

(52) U.S. Cl.
CPC ............ *A61J 17/111* (2020.05); *A61J 17/001* (2015.05)

(58) Field of Classification Search
CPC ....... A61J 17/111; A61J 11/00; A61J 17/1111; A61J 17/1115
See application file for complete search history.

(56) References Cited

U.S. PATENT DOCUMENTS

| | | | |
|---|---|---|---|
| 4,796,628 A | 1/1989 | Anderson | |
| 2017/0326036 A1 | 11/2017 | Kim | |
| 2021/0106501 A1* | 4/2021 | Blake | A61J 17/113 |

FOREIGN PATENT DOCUMENTS

| | | | |
|---|---|---|---|
| JP | 2006-34779 A | 2/2006 | |

OTHER PUBLICATIONS

The extended European search report for the corresponding EP application No. 20840641.3 mailed Jul. 21, 2022.

(Continued)

*Primary Examiner* — Katherine H Schwiker
*Assistant Examiner* — Zehra Jaffri
(74) *Attorney, Agent, or Firm* — Muncy, Geissler, Olds & Lowe, P.C.

(57) ABSTRACT

A pacifier 2 includes: a nipple portion 3 held in a mouth of the infant; and a back plate portion 4 that has an asymmetrical shape with respect to an axis 36 passing through a center 35 of the nipple portion 3 and extending in a vertical direction connecting a nose and the mouth of the infant in a state where the infant holds the pacifier 2 in the mouth. The back plate portion 4 includes: a main body portion 41; and an extension portion 42 that is connected to the main body portion 41 on either side of a lateral direction that is perpendicular to the vertical direction and connects left and right cheeks of the infant in a state where the infant holds the pacifier 2 in the mouth, the extension portion 42 extending from the main body portion 41 toward the either side.

6 Claims, 4 Drawing Sheets

(56) References Cited

OTHER PUBLICATIONS

International Search Report of the corresponding WIPO application No. PCT/JP2020/027283 mailed Sep. 24, 2020 and English translation thereof.

Written Opinion of the International Searching Authority of the corresponding WIPO application No. PCT/JP2020/027283 mailed Sep. 24, 2020.

* cited by examiner

FIG. 3
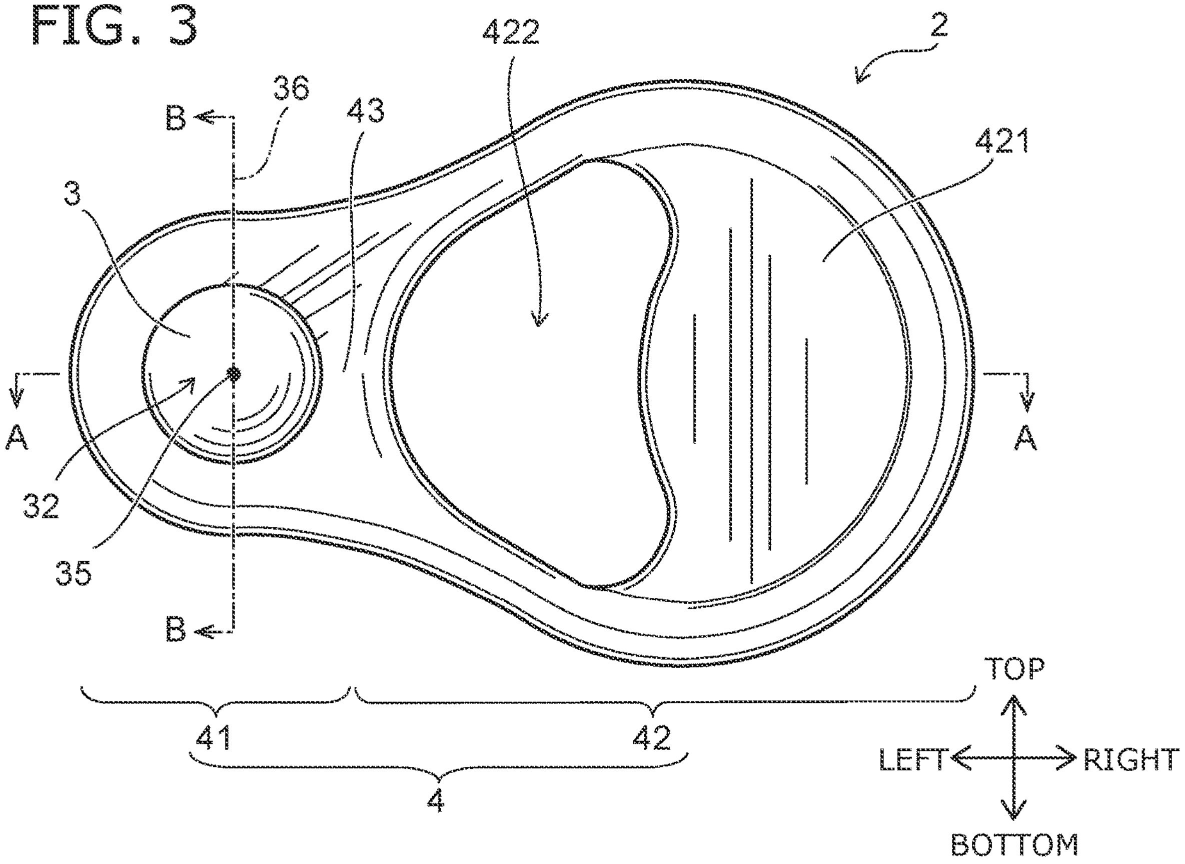
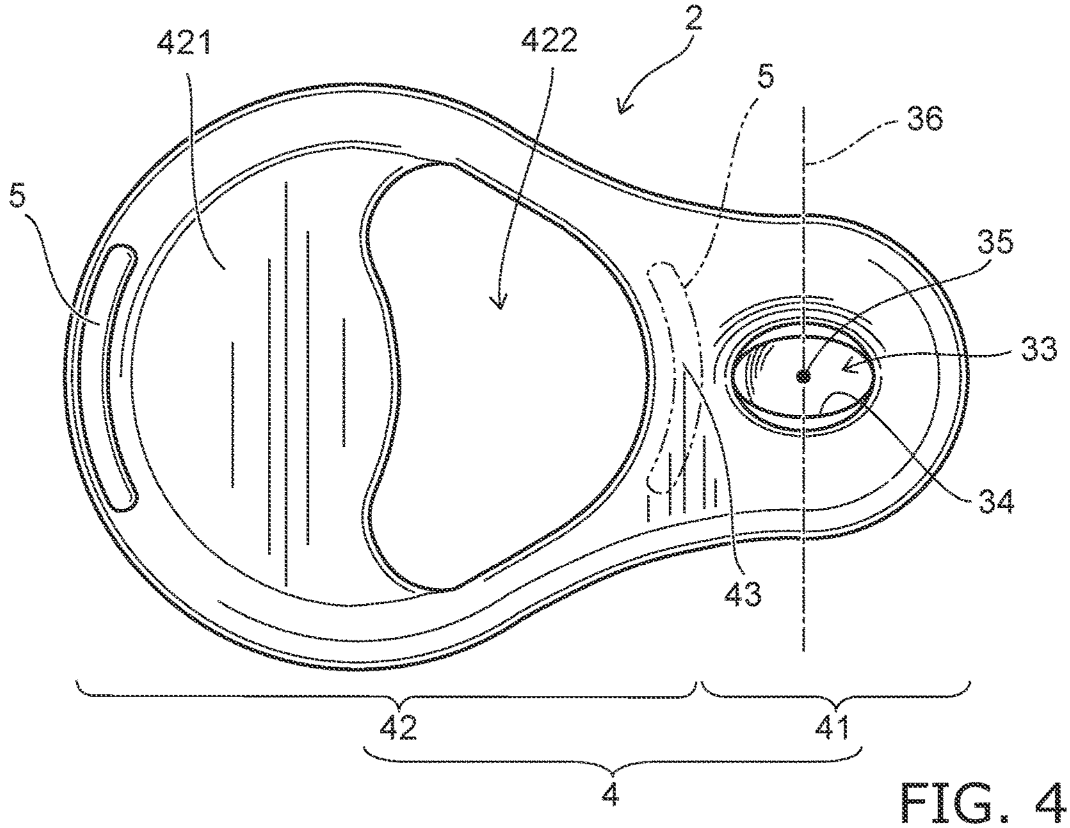
FIG. 4

PACIFIER

TECHNICAL FIELD

The present invention relates to a pacifier used by an infant hospitalized in a neonatal intensive care unit.

BACKGROUND ART

A Neonatal Intensive Care Unit (NICU) is intended to provide intensive care for, for example, infants born prematurely, low birth weight infants, infants with respiratory distress from birth, and infants suspected of having congenital heart disease. For infants in the NICU (may be referred to as "NICU infants" hereinafter for explanatory convenience), for example, fluctuations in vital signs due to crying at the time of blood collection place a heavy burden on their bodies. Therefore, pacifiers are used in the NICU to soothe the NICU infants and control their crying.

In addition, unlike term infants, NICU infants cannot drink breast milk whenever they want. Thus, compared to term infants, NICU infants have less chance to activate sucking reflex. This raises concern about whether a smooth transition from tube feeding to oral feeding can be achieved or not. For this reason, pacifiers are used in the NICU to maintain or expedite the sucking reflex and oral cavity stimulation necessary in oral feeding. Furthermore, in NICU, recently pacifiers are often used for pain care.

PTL 1 discloses a pacifier that includes a nipple portion and a back plate portion. The back plate portion described in PTL 1 is formed of a material with a predetermined rigidity, such as polypropylene, polycarbonate, polyether sulfone, or polyamide, is arranged at a base portion of the nipple portion, and has a predetermined spread. The pacifier described in PTL 1 has a shape symmetric with respect to an axis extending in a vertical direction passing through the center of the nipple portion and connecting the nose and mouth of the infant in a state where the infant has the pacifier in his/her mouth. Specifically, the pacifier described in PTL 1 is formed in a symmetrical shape in a lateral direction (width direction) connecting the left and right cheeks of the infant in a state where the infant has the pacifier in his/her mouth.

However, the forces of NICU infants sucking the nipple portion are weaker than the forces of term infants sucking the nipple portion. This means that the NICU infants may not be able to keep in their mouths the pacifier, such as the one disclosed in PTL 1, as term infants do. In addition, NICU infants often sleep on their sides (side-lying position) instead of sleeping on their backs. Since the pacifier used by term infants disclosed in PTL 1 has the back plate portion with a predetermined spread and is formed so as to be symmetrical in the lateral direction, when the NICU infants hold the pacifier in their mouths while in a side-lying position, the back plate portion of the pacifier often comes into contact with, for example, the mattress, pillow, towel, towel-like blanket, blanket, and the like. This means that the NICU infants may not be able to keep in their mouths the pacifier, such as the one disclosed in PTL 1, as term infants do.

Further, various types of equipment and devices such as a vital monitor and tubes for feeding NICU infants with nutrients and oxygen may be attached to the NICU infants. In such a case, the back plate portion of the pacifier used by term infants that is disclosed in PTL 1 may become an obstacle to the equipment and devices attached to the NICU infants. This means that the NICU infants may not be able to keep in their mouths the pacifier, such as the one disclosed in PTL 1, as term infants do. For these reasons, the pacifiers used by term infants have room for improvement in terms of the feature in which NICU infants cannot keep these pacifiers in their mouths.

CITATION LIST

Patent Literature

[PTL 1] Japanese Patent Application Publication No. 2006-34779

SUMMARY OF INVENTION

Technical Problem

The present invention has been made in order to solve the foregoing problems, and an object thereof is to provide a pacifier that an infant hospitalized in a neonatal intensive care unit can keep in his/her mouth.

Solution to Problem

The foregoing problems are solved by a pacifier used by an infant hospitalized in a neonatal intensive care unit, the pacifier including: a nipple portion held in a mouth of the infant; and a back plate portion that is connected to a base portion of the nipple portion and has an asymmetrical shape with respect to an axis passing through a center of the nipple portion and extending in a vertical direction connecting a nose and the mouth of the infant in a state where the infant holds the pacifier in the mouth, wherein the back plate portion includes: a main body portion connected to the base portion; and an extension portion that is connected to the main body portion on either side of a lateral direction that is perpendicular to the vertical direction and connects left and right cheeks of the infant in a state where the infant holds the pacifier in the mouth, the extension portion extending from the main body portion toward the either side.

The pacifier according to the present invention includes the nipple portion held in the mouth of an infant hospitalized in a neonatal intensive care unit (NICU infant), and the back plate portion. The back plate portion is connected to the base portion of the nipple portion and has an asymmetrical shape with respect to the axis passing through the center of the nipple portion and extending in the vertical direction. The term "vertical direction" refers to a direction connecting the nose and mouth of the NICU infant in a state where the NICU infant holds the pacifier in his/her mouth. In other words, the back plate portion is formed in an asymmetrical shape in the lateral direction (width direction) perpendicular to the vertical direction. The term "lateral direction" refers to a direction connecting the left and right cheeks of the NICU infant in a state where the NICU infant holds the pacifier in his/her mouth. The back plate portion also includes the main body portion connected to the base portion of the nipple portion, and the extension portion. The extension portion is connected to the main body portion on either side of the lateral direction perpendicular to the vertical direction and extends from the main body portion toward the either side. Specifically, the extension portion extends from the main body portion toward only either the left side or the right side, is not connected to the main body portion on the other side, and does not extend from the main body portion toward the other side. Thus, compared to a pacifier used by a term infant, the pacifier according to the present invention can be made light. Accordingly, even the NICU infant, who has a weaker suction to suck the nipple portion than a term infant, can keep the pacifier in his/her mouth.

Since the extension portion extends from the main body portion toward the left side or the right side, even in a case where the NICU infant sleeps in a side-lying position, a healthcare worker can place the extension portion on the left cheek or the right cheek of the NICU infant in the side-lying position, the left cheek or the right cheek facing up. Thus, the back plate portion can be prevented from coming into contact with, for example, the mattress, pillow, towel, towel-like blanket, and blanket. Accordingly, even when the NICU infant sleeps in a side-lying position, the NICU infant can keep the pacifier in his/her mouth.

The healthcare worker can also allow the left cheek or the right cheek of the NICU infant in a side-lying position to support the extension portion, the left cheek or the right cheek facing up. Consequently, the NICU infant can stably keep the pacifier in his/her mouth.

Since the NICU infant can keep the pacifier in his/her mouth as described above, not only is it possible to reduce the physical stress of the NICU infant by soothing the NICU infant and controlling his/her crying, but also the sucking reflex and oral cavity stimulation necessary in oral feeding can be maintained or expedited.

In the pacifier according to the present invention, preferably, the main body portion has a shape extending in the form of a flange from the base portion to a periphery of the base portion.

In the pacifier according to the present invention, the main body portion has a shape extending from the base portion of the nipple portion to a periphery of the base portion of the nipple portion in the form of a flange. That is, the main body portion functions as a flange portion that comes into contact with the lips of the NICU infant holding the nipple portion in his/her mouth, to stop the tip of the mouth of the NICU infant near the base portion of the nipple portion. This keeps the NICU infant from swallowing the pacifier.

In the pacifier according to the present invention, preferably, the extension portion is provided with a through hole.

In the pacifier according to the present invention, the extension portion is provided with a through hole. By providing the through hole, the pacifier can be made lighter. Thus, the NICU infant can keep the pacifier in his/her mouth. In addition, in a state where the NICU infant holds the nipple portion in his/her mouth, the healthcare worker can check the movements of the lips and mouth of the NICU infant through the through hole.

In the pacifier according to the present invention, preferably, the nipple portion includes a hollow portion formed inside the nipple portion so as to extend from the base portion to a tip portion of the nipple portion, and an opening portion formed as an end portion on one side of the hollow portion in the base portion.

In the pacifier according to the present invention, the nipple portion includes the hollow portion and the opening portion. The hollow portion is formed inside the nipple portion so as to extend from the base portion of the nipple portion to the tip portion of the nipple portion. The opening portion is formed in the base portion of the nipple portion as an end portion on one side of the hollow portion. That is, the hollow portion formed inside the nipple portion is opened as the opening portion at the base portion of the nipple portion. Therefore, in a state where the NICU infant holds the nipple portion in his/her mouth, the healthcare worker can check the movements of the tongue inside the oral cavity of the NICU infant through the opening portion and the hollow portion of the nipple portion.

The pacifier according to the present invention preferably further includes a grip portion extending from the extension portion toward a side opposite to a direction in which the nipple portion extends.

In the pacifier according to the present invention, the grip portion extends from the extension portion toward the side opposite to the direction in which the nipple portion extends. Therefore, by grabbing the grip portion, the healthcare worker can hygienically remove from the mouth of the NICU infant the pacifier held in the mouth of the NICU infant.

Advantageous Effects of Invention

The present invention can provide a pacifier that an infant hospitalized in a neonatal intensive care unit can keep in his/her mouth.

BRIEF DESCRIPTION OF DRAWINGS

FIG. 3 is a front view illustrating the pacifier according to the embodiment.

FIG. 4 is a rear view illustrating the pacifier according to the embodiment.

DESCRIPTION OF EMBODIMENTS

Figure 1:
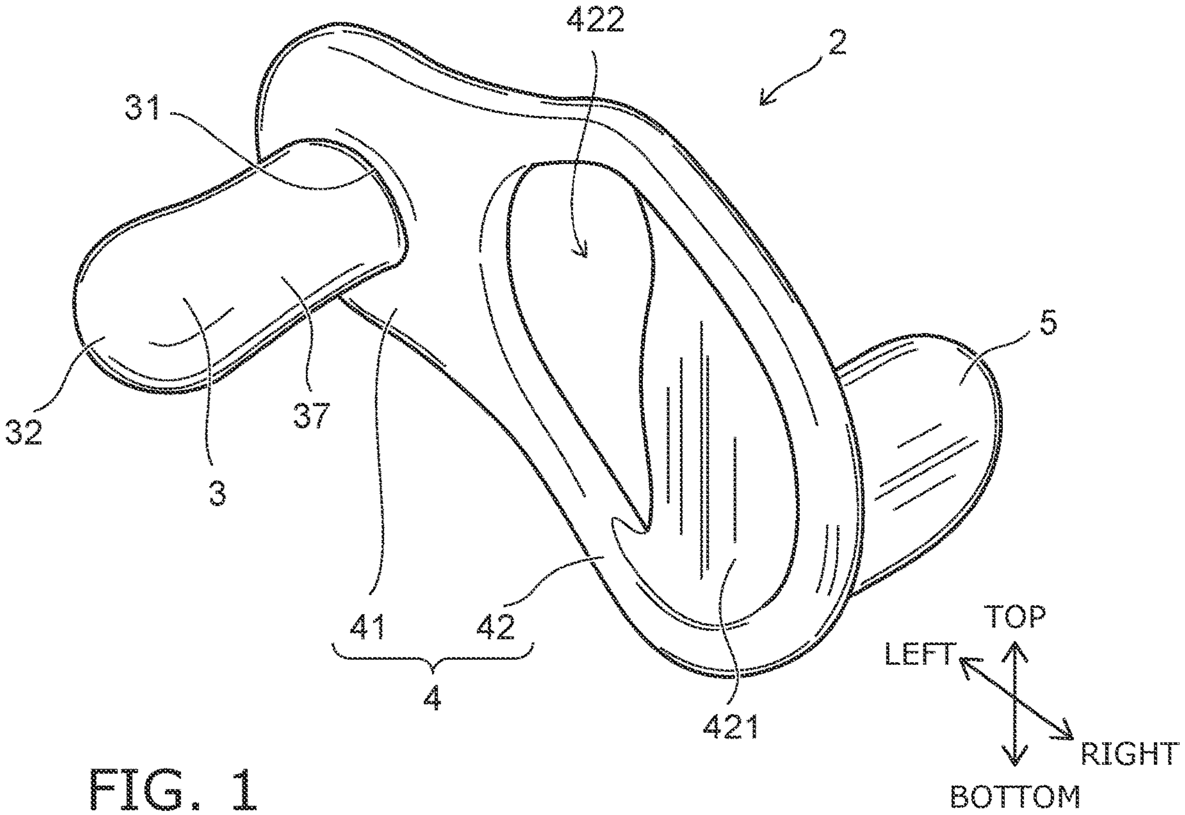
FIG. 1 is a perspective view illustrating a pacifier according to an embodiment of the present invention.

A preferred embodiment of the present invention is now described hereinafter in detail with reference to the drawings.

Since the embodiments described below are suitable specific examples of the present invention, various technically preferable limitations are applied to the present invention. However, the scope of the present invention is not limited to these embodiments unless it is stated in the following description that the present invention is particularly limited. In addition, in each drawing, the same components are designated by the same reference numerals; detailed descriptions thereof are omitted accordingly.

Figure 2:
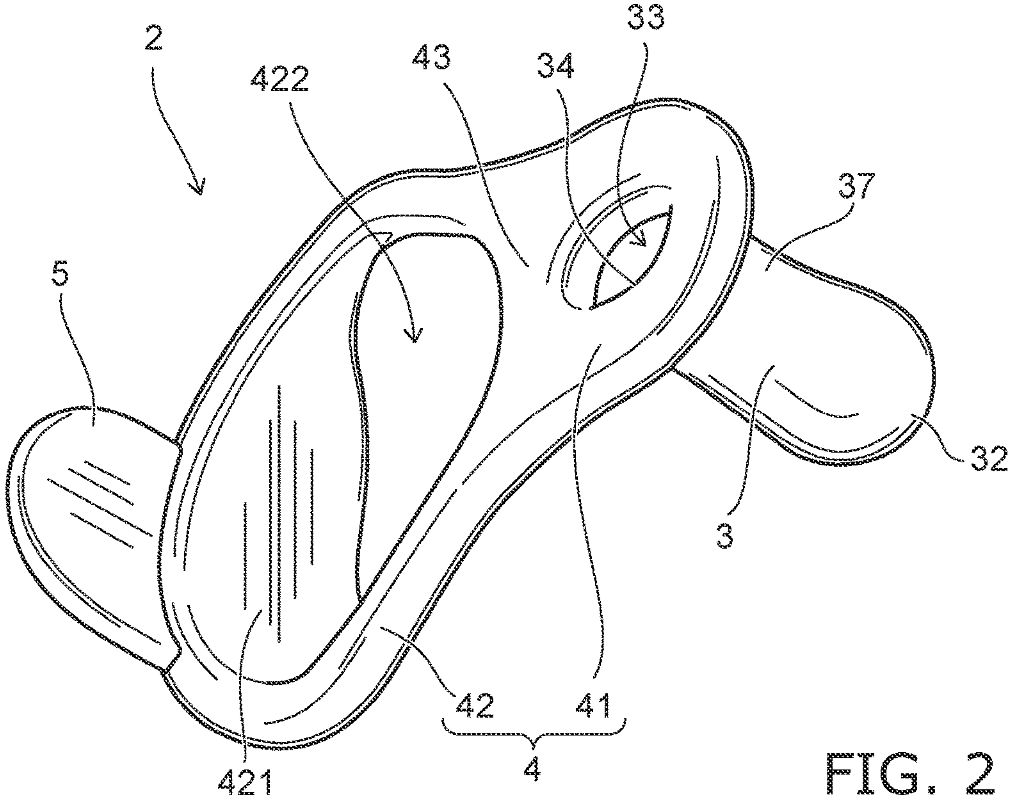
FIG. 2 is a perspective view illustrating the pacifier according to the embodiment.

A pacifier 2 according to an embodiment of the present invention is now described with reference to FIGS. 1 to 8. The pacifier 2 according to the present embodiment is a pacifier used by an infant hospitalized in a neonatal intensive care unit (NICU) (may be referred to as "NICU infant" hereinafter for explanatory convenience). As illustrated in FIGS. 1 and 2, the pacifier 2 includes a nipple portion 3 and a back plate portion 4. The pacifier 2 may further include a grip portion 5.

The pacifier 2 is entirely made of the same material. In consideration of the hardness, thickness, and the like, the nipple portion 3 is formed to have the same hardness as the nipple portion of a baby bottle. Examples of the material of the pacifier 2 include a thermoplastic elastomer made of silicone rubber, isoprene rubber, natural rubber, polypropylene, or the like. Currently, silicone rubber that can withstand high-pressure steam sterilization is a more preferred material of the pacifier 2.

Figure 8:
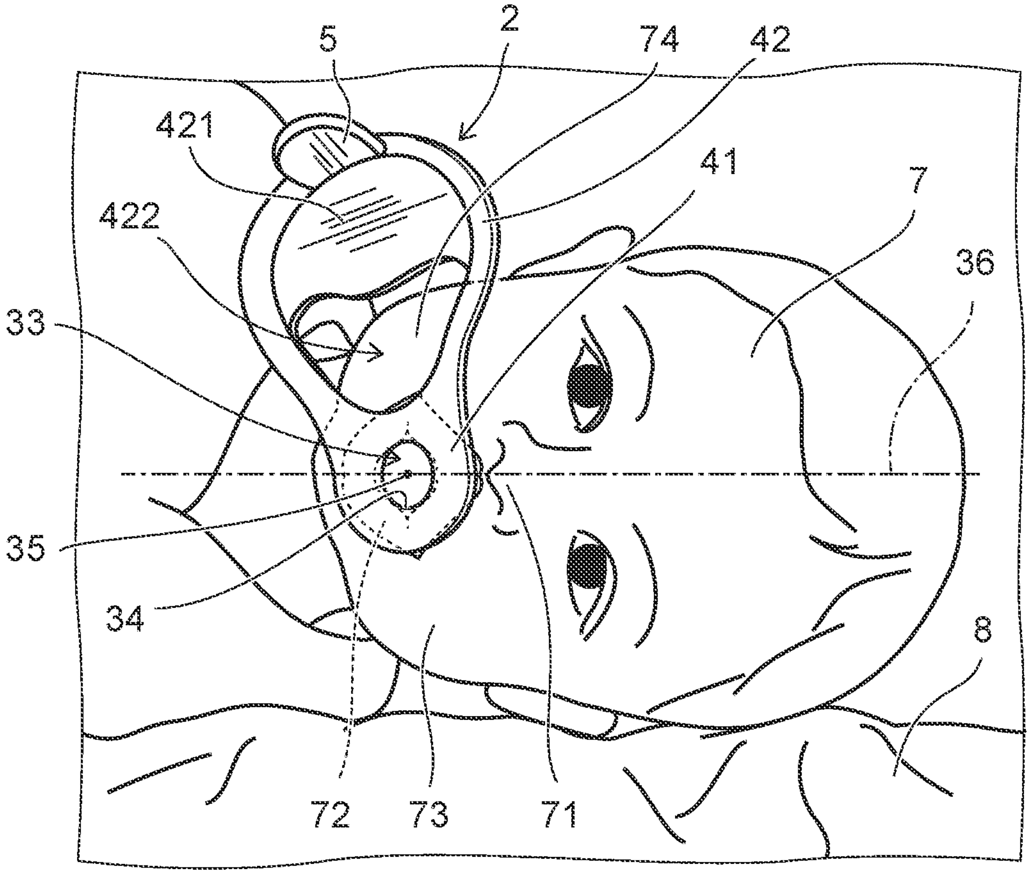
FIG. 8 is a schematic view illustrating a state where an NICU infant holds the pacifier according to the embodiment in his/her mouth while in a side-lying position.

The nipple portion 3 is a part held by an NICU infant 7 in his/her mouth (see FIG. 8). In other words, the nipple portion 3 is a part inserted into the oral cavity of the NICU infant 7. The nipple portion 3 is connected to the back plate portion 4 at a base portion 31. The nipple portion 3 includes a flat portion 37 formed between the base portion 31 and a tip portion 32. The cross-sectional shape of the flat portion 37 on a cut section in a direction perpendicular to a direction in which the nipple portion 3 extends, is in a flat shape. Specifically, the length of the flat portion 37 in a vertical direction is shorter than that of the flat portion 37 in a lateral direction (width direction).

In the present specification, as illustrated in FIG. 8, the term "vertical direction" refers to the direction connecting a nose 71 and a mouth 72 of the NICU infant 7 in a state where the NICU infant 7 holds the pacifier 2 in his/her mouth. Also, in the present specification, as illustrated in FIG. 8, the term "lateral direction" refers to the direction that is perpendicular to the vertical direction and connects a left cheek 73 and a right cheek 74 of the NICU infant 7 in a state where the NICU infant 7 holds the pacifier 2 in his/her mouth.

Since the nipple portion 3 includes the flat portion 37, the NICU infant 7 can easily hold the nipple portion 3 in his/her mouth 72 without opening his/her mouth 72 wide to put the nipple portion 3 into his/her mouth 72. The flat portion 37 can then be fit snugly into the small mouth 72 of the NICU infant 7. Furthermore, even when, for example, naturally closing his/her mouth 72 to fall asleep, the NICU infant 7 can easily close his/her mouth 72 while holding the flat portion 37 therein. As such, the NICU infant 7 can keep the pacifier 2 in his/her mouth.

Figure 6:
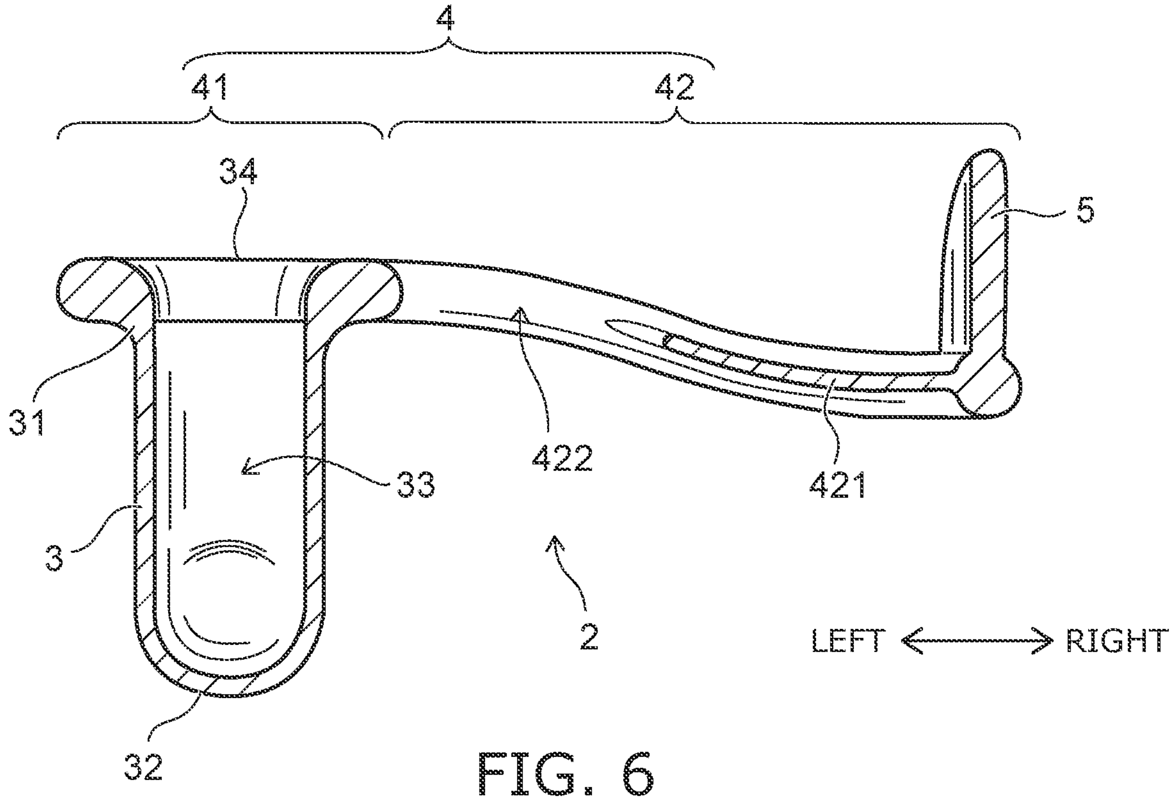
FIG. 6 is a cross-sectional view taken along a cut section A-A shown in FIG. 3.
Figure 7:
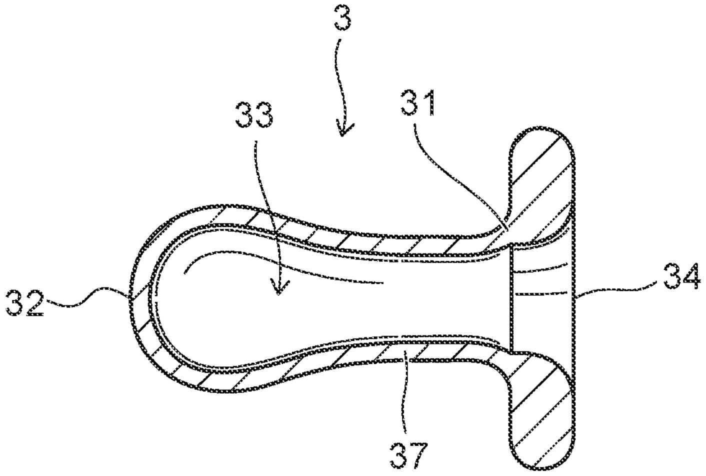
FIG. 7 is a cross-sectional view taken along a cut section B-B shown in FIG. 3.

As illustrated in FIGS. 6 and 7, the nipple portion 3 includes a hollow portion 33 and an opening portion 34. The hollow portion 33 is a spatial part formed inside the nipple portion 3 so as to extend from the base portion 31 of the nipple portion 3 to the tip portion 32 of the nipple portion 3. The opening portion 34 is formed in the base portion 31 as an end portion on one side of the hollow portion 33. That is, the hollow portion 33 formed inside the nipple portion 3 is opened as the opening portion 34 at the base portion 31 of the nipple portion 3.

The back plate portion 4 is connected to the base portion 31 of the nipple portion 3 and has an asymmetrical shape with respect to an axis 36 passing through a center 35 of the nipple portion 3 and extending in the vertical direction connecting the nose 71 and the mouth 72 of the NICU infant 7 in a state where the NICU infant 7 holds the pacifier 2 in his/her mouth. The back plate portion 4 includes a main body portion 41 and an extension portion 42.

The main body portion 41 is connected to the base portion 31 of the nipple portion 3. The main body portion 41 has a shape extending from the base portion 31 to a periphery of the base portion 31 in the form of a flange. That is, the main body portion 41 functions as a flange portion that comes into contact with the lips of the NICU infant 7 holding the nipple portion 3 in his/her mouth, to stop the tip of the mouth 72 of the NICU infant 7 near the base portion 31 of the nipple portion 3.

The extension portion 42 is connected to the main body portion 41 at either side of the lateral direction that is perpendicular to the vertical direction and connects the left cheek 73 and the right cheek 74 of the NICU infant 7 in a state where the NICU infant 7 holds the pacifier 2 in his/her mouth. As illustrated in FIG. 3, in the pacifier 2 according to the present embodiment, the extension portion 42 is connected to the main body portion 41 on the right side of the lateral direction that is perpendicular to the axis 36 extending in the vertical direction.

The extension portion 42 also extends from the part thereof connected to the main body portion 41 to either side of the lateral direction connecting the left cheek 73 and the right cheek 74 of the NICU infant 7. That is, in a case where the extension portion 42 is connected to the left side of the main body portion 41, the extension portion 42 extends from the part thereof connected to the main body portion 41 to the left. In a case where the extension portion 42 is connected to the right side of the main body portion 41, the extension portion 42 extends from the part thereof connected to the main body portion 41 to the right. As illustrated in FIG. 3, in the pacifier 2 according to the present embodiment, the extension portion 42 is connected to the right side of the main body portion 41 and extends from the part thereof connected to the main body portion 41 to the right.

Therefore, the extension portion 42 extends from the main body portion 41 to only either the left side or the right side, is not connected to the main body portion 41 on the other side, and does not extend from the main body portion 41 toward the other side. In other words, the back plate portion 4 is connected to the base portion 31 of the nipple portion 3 and has an asymmetrical shape with respect to the axis 36 passing through the center 35 of the nipple portion 3 and extending in the vertical direction. Specifically, the back plate portion 4 is formed in an asymmetrical shape in the lateral direction perpendicular to the vertical direction. Note that the back plate portion 4 has a symmetrical shape with respect to an axis passing through the center 35 of the nipple portion 3 and extending in the lateral direction (see the one-dot chain line representing the cut section A-A shown in FIG. 3). Accordingly, the pacifier 2 according to the present embodiment can conform to either side of the lateral direction connecting the left cheek 73 and the right cheek 74 of the NICU infant 7.

As illustrated in FIGS. 3 and 4, when viewed along the direction in which the nipple portion 3 extends, the extension portion 42 is larger than the main body portion 41. Specifically, the length of the extension portion 42 in the vertical direction is greater than that of the main body portion 41 in the vertical direction. Also, the length of the extension portion 42 in the lateral direction is longer than that of the main body portion 41 in the lateral direction.

The extension portion 42 includes a reinforcing portion 421. The reinforcing portion 421 can ensure the strength of the extension portion 42. As illustrated in FIG. 6, the reinforcing portion 421 is provided in a part surrounded by a rim of the extension portion 42, and is formed in the shape of a thin film. Specifically, the reinforcing portion 421 is thinner than the rim part of the extension portion 42. That is, a step is provided between the reinforcing portion 421 and the rim part of the extension portion 42. Therefore, the reinforcing portion 421 can be made light while ensuring the strength of the extension portion 42 by means of the reinforcing portion 421. Accordingly, the pacifier 2 can be made light.

Furthermore, a through hole 422 is provided in the part surrounded by the rim of the extension portion 42. Specifically, as illustrated in FIGS. 3 and 4, the through hole 422 is provided between the reinforcing portion 421 and a connection part 43. The connection part 43 is a part where the main body portion 41 and the extension portion 42 are connected to each other.

Figure 5:
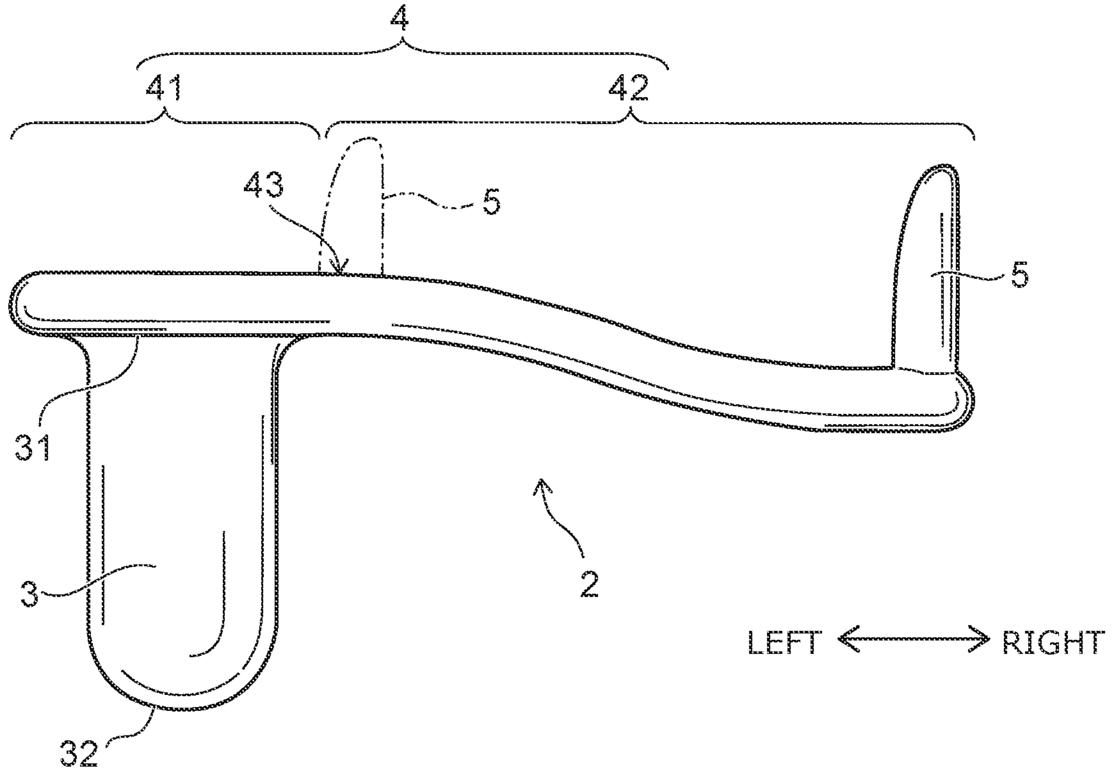
FIG. 5 is a plan view illustrating the pacifier according to the embodiment.

As illustrated in FIGS. 5 and 6, in the pacifier 2 according to the present embodiment, the extension portion 42 is connected to the right side of the main body portion 41 and extends from the main body portion 41 to the right. In this case, the extension portion 42 is inclined toward the side of the tip portion 32 of the nipple portion 3 as the extension portion 42 extends from the main body portion 41 to the right. That is, in a state where the NICU infant 7 holds the pacifier in his/her mouth, the extension portion 42 extends in a direction toward the right cheek 74 of the NICU infant 7 as the extension portion 42 extends from the main body portion 41 to the right. Consequently, as illustrated in FIG. 8, in a state where the NICU infant 7 holds the pacifier 2 in his/her mouth, the extension portion 42 is stably supported by the left cheek 73 or the right cheek 74 of the NICU infant 7. In the state illustrated in FIG. 8, when the NICU infant 7 holds the pacifier 2 in his/her mouth, the extension portion 42 is stably supported by the right cheek 74 of the NICU infant 7. Accordingly, the NICU infant 7 can keep the pacifier 2 in his/her mouth while having the pacifier 2 supported stably by the left cheek 73 or the right cheek 74 of the NICU infant 7.

In addition, as illustrated in FIGS. 5 and 6, in the vicinity of the end portion on the side to which the extension portion 42 extends (the end portion on the right side, in the present embodiment), the extension portion 42 extends substantially parallel to a peripheral part of the base portion 31 extending in the shape of a flange. That is, in the state where the NICU infant 7 holds the pacifier 2 in his/her mouth, the end portion on the side to which the extension portion 42 extends, extends in a direction away from the left cheek 73 and the right cheek 74 of the NICU infant 7. Accordingly, the entire extension portion 42 can be prevented from coming into close contact with the left cheek 73 and the right cheek 74 of the NICU infant 7. Therefore, sweatiness of the left cheek 73 and the right cheek 74 of the NICU infant 7 can be suppressed. Further, since the step is provided between the reinforcing portion 421 and the rim part of the extension portion 42, the entire extension portion 42 can be further prevented from coming into close contact with the left cheek 73 and the right cheek of the NICU infant 7, thereby further suppressing the occurrence of sweatiness in the left cheek 73 and the right cheek 74 of the NICU infant 7.

The grip portion 5 extends from the extension portion 42 toward the side opposite to the direction in which the nipple portion 3 extends. For example, in a state where the NICU infant 7 holds the pacifier 2 in his/her mouth, the nipple portion 3 extends toward the oral cavity of the NICU infant 7, and the grip portion 5 extends in the direction away from the mouth 72 of the NICU infant 7. As illustrated in FIGS. 4 to 6, the grip portion 5 is provided at the end portion on the side to which the extension portion 42 extends (the end portion on the right side, in the present embodiment). In other words, the grip portion 5 is provided at the end portion opposite to the nipple portion 3.

Note that an installation location of the grip portion 5 is not limited to the end portion on the side to which the extension portion 42 extends. For example, as shown by the two-dot chain lines in FIGS. 4 and 5, the grip portion 5 may be provided at the connection part 43 between the main body portion and the extension portion 42, and may extend from the connection part 43 toward the side opposite to the direction in which the nipple portion 3 extends. That is, the grip portion 5 shown by the two-dot chain lines in FIGS. 4 and 5 is provided in the vicinity of the nipple portion 3.

According to the pacifier 2 of the present embodiment, the back plate portion 4 is connected to the base portion 31 of the nipple portion 3 and has an asymmetrical shape with respect to the axis 36 passing through the center 35 of the nipple portion 3 and extending in the vertical direction. Specifically, the back plate portion 4 is formed in an asymmetrical shape in the lateral direction perpendicular to the vertical direction. Specifically, the extension portion 42 of the back plate portion 4 is connected to the main body portion 41 of the back plate portion 4 on either side of the lateral direction perpendicular to the vertical direction and extends from the main body portion 41 toward either side of the lateral direction. Specifically, the extension portion 42 extends from the main body portion 41 toward only either the left side or the right side, is not connected to the main body portion 41 on the other side, and does not extend from the main body portion 41 toward the other side. Thus, compared to a pacifier used by a term infant, the pacifier 2 according to the present invention can be made light. Accordingly, even the NICU infant 7, who has a weaker suction to suck the nipple portion 3 than a term infant, can keep the pacifier 2 in his/her mouth.

Also, as illustrated in FIG. 8, since the extension portion 42 extends from the main body portion 41 to the left or right side, even in a case where the NICU infant 7 sleeps in a side-lying position, a healthcare worker can place the extension portion 42 on the left cheek 73 or the right cheek 74 of the NICU infant 7 in the side-lying position, the left cheek 73 or the right cheek 74 facing up. In the example illustrated in FIG. 8, the extension portion 42 is arranged on the right cheek 74 of the NICU infant 7 sleeping in a side-lying position, the right cheek 74 facing up. Therefore, the back plate portion 4 can be prevented from coming into contact with the bedding 8 such as the mattress, pillow, towel, towel-like blanket, or blanket. Therefore, even when the NICU infant 7 sleeps in a side-lying position, the NICU infant 7 can keep the pacifier 2 in his/her mouth.

The healthcare worker can also allow the left cheek 73 or the right cheek 74 of the NICU infant 7 sleeping in a side-lying position to support the extension portion 42, the left cheek 73 or the right cheek 74 facing up. In the example illustrated in FIG. 8, the extension portion 42 is supported on the right cheek 74 of the NICU infant 7 in a side-lying position, the right cheek 74 facing up. Therefore, the NICU infant 7 can stably keep the pacifier 2 in his/her mouth.

Since the NICU infant 7 can keep the pacifier 2 in his/her mouth as described above, not only is it possible to reduce the physical stress of the NICU infant 7 by soothing the NICU infant 7 and controlling his/her crying, but also the sucking reflex and oral cavity stimulation necessary in oral feeding can be maintained or expedited.

Furthermore, the main body portion 41 functions as a flange portion that comes into contact with the lips of the NICU infant 7 holding the nipple portion 3 in his/her mouth, to stop the tip of the mouth 72 of the NICU infant 7 near the base portion 31 of the nipple portion 3. This keeps the NICU infant 7 from swallowing the pacifier 2.

Moreover, the reinforcing portion 421 for ensuring the strength of the extension portion 42 is provided in the part surrounded by the rim of the extension portion 42. Therefore, even in a case where the extension portion 42 extends from the main body portion 41 to the left or right side and is made of a material having the same flexibility and low hardness as the nipple portion 3, the strength of the extension portion 42 can be ensured. Furthermore, the through hole 422 is provided in the part surrounded by the rim of the extension portion 42. Therefore, while ensuring the strength of the extension portion 42 by means of the reinforcing portion 421, the pacifier 2 can be made lighter by the through hole 422. Accordingly, this can allow the NICU infant 7 to keep the pacifier 2 in his/her mouth, while keeping the NICU infant 7 from swallowing the pacifier 2. In addition, in a state where the NICU infant 7 holds the nipple portion 3 in his/her mouth, the healthcare worker can check the movements of the lips and mouth 72 of the NICU infant 7 through the through hole 422.

Moreover, the hollow portion 33 formed inside the nipple portion 3 is opened as the opening portion 34 at the base portion 31 of the nipple portion 3. Therefore, in a state where the NICU infant 7 holds the nipple portion 3 in his/her mouth, the healthcare worker can check the movements of the tongue inside the oral cavity of the NICU infant 7 through the opening portion 34 and the hollow portion 33 of the nipple portion 3.

Also, the grip portion 5 extends from the extension portion 42 toward the side opposite to the direction in which the nipple portion 3 extends. Therefore, by grabbing the grip portion 5, the healthcare worker can hygienically remove from the mouth 72 of the NICU infant 7 the pacifier 2 held in the mouth of the NICU infant 7.

As described above, the grip portion 5 may be provided in the connection part 43 between the main body portion 41 and the extension portion 42. In this case, the center of gravity of the pacifier 2 can be brought close to the nipple portion 3 as compared to when the grip portion 5 is provided in a position relatively far from the nipple portion 3. Thus, the NICU infant 7 can keep the pacifier 2 in his/her mouth more stably, the pacifier 2 having its center of gravity set near the nipple portion 3.

Also, when viewed along the direction in which the nipple portion 3 extends, the extension portion 42 is larger than the main body portion 41. Thus, the healthcare worker can allow the left cheek 73 or the right cheek 74 of the NICU infant in a side-lying position to stably support the extension portion 42, the left cheek 73 or the right cheek 74 facing up, and allow the NICU infant 7 to keep the pacifier 2 in his/her mouth more stably. In addition, since the main body portion 41 is smaller than the extension portion 42, the healthcare worker can attach, to the NICU infant, various types of equipment and devices such as a vital monitor and tubes for feeding the NICU infant 7 with nutrients and oxygen, through the vicinity of the main body portion 41. Consequently, the back plate portion 4 of the pacifier 2 can be prevented from becoming an obstacle to the equipment and devices attached to the NICU infant 7. Accordingly, even the NICU infant 7 having various types of equipment and devices attached thereto can keep the pacifier 2 in his/her mouth.

The above has described an embodiment of the present invention. However, the present invention is not limited to the foregoing embodiment, and various modifications can be made without departing from the scope of claims. The configuration of the foregoing embodiment can be partially omitted or arbitrarily combined so as to be different from the foregoing configuration.

REFERENCE SIGNS LIST

2 Pacifier
3 Nipple portion
4 Back plate portion
5 Grip portion
7 NICU infant
8 Bedding
31 Base portion
32 Tip portion
33 Hollow portion
34 Opening portion
35 Center
36 Axis
37 Flat portion
41 Main body portion
42 Extension portion
43 Connection part
71 Nose
72 Mouth
73 Left cheek
74 Right cheek
421 Reinforcing portion
422 Through hole

The invention claimed is:

1. A pacifier used by an infant hospitalized in a neonatal intensive care unit and comprising:

a nipple portion configured to be held in a mouth of the infant; and a back plate portion that is connected to a base portion of the nipple portion and has an asymmetrical shape with respect to an axis passing through a center of the nipple portion and extending in a vertical direction configured for connecting a nose and the mouth of the infant in a state where the infant holds the pacifier in the mouth, wherein the back plate portion includes:

a main body portion connected to the base portion and having a shape extending in the form of a flange from the base portion to a periphery of the base portion; and an extension portion that is connected to the main body portion on only one of a left side or a right side of the main body portion in a lateral direction, wherein the lateral direction is perpendicular to the vertical direction and configured to connect left and right cheeks of the infant in the state where the infant holds the pacifier in the mouth, the extension portion extends from the main body portion in the lateral direction only on the one of the left side or the right side of the main body portion, and the extension portion is inclined toward a side of a tip portion of the nipple portion as the extension portion extends from the main body portion.

2. The pacifier according to claim 1, wherein the extension portion is provided with a through hole.

3. The pacifier according to claim 1, wherein the nipple portion includes a hollow portion formed inside the nipple portion so as to extend from the base portion to the tip portion of the nipple portion, and an opening portion formed as an end portion on one side of the hollow portion in the base portion.

4. The pacifier according to claim 1, further comprising a grip portion extending from the extension portion toward a side opposite to a direction in which the nipple portion extends.

5. The pacifier according to claim 1, wherein the extension portion is larger than the main body portion when viewed along the direction in which the nipple portion extends.

6. The pacifier according to claim 1, wherein the extension portion includes a reinforcing portion that is provided in a part surrounded by a rim of the extension portion and is thinner than the rim of the extension portion, and a step is provided between the reinforcing portion and the rim of the extension portion.

* * * * *